United States Patent
Tashiro

(10) Patent No.: US 9,606,490 B2
(45) Date of Patent: Mar. 28, 2017

(54) ROTATION FORCE TRANSMISSION MECHANISM AND IMAGE FORMING APPARATUS

(71) Applicant: KYOCERA Document Solutions Inc., Osaka (JP)

(72) Inventor: Yoshiaki Tashiro, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/006,539

(22) Filed: Jan. 26, 2016

(65) Prior Publication Data
US 2016/0216673 A1 Jul. 28, 2016

(30) Foreign Application Priority Data
Jan. 27, 2015 (JP) .................................. 2015-012940

(51) Int. Cl.
*G03G 15/00* (2006.01)
*F16H 1/22* (2006.01)
(Continued)

(52) U.S. Cl.
CPC .......... *G03G 15/6529* (2013.01); *F16H 1/22* (2013.01); *G03G 15/6552* (2013.01); *F16D 7/00* (2013.01);
(Continued)

(58) Field of Classification Search
CPC ................................................ G03G 15/6555
(Continued)

(56) References Cited

U.S. PATENT DOCUMENTS 5,041,845 A * 8/1991 Ohkubo ................. B41J 23/025
346/24
6,792,242 B2 * 9/2004 Suzaki ............... G03G 15/6514
271/207

(Continued)

FOREIGN PATENT DOCUMENTS

| JP | 2001-226011 A | 8/2001 |
| JP | 2010-023983 A | 2/2010 |
| JP | 2013139336 A | 7/2013 |

OTHER PUBLICATIONS

An Office Action; "Notification of Reasons for Refusal" issued by the Japanese Patent Office on Aug. 9, 2016, which corresponds to Japanese Patent Application No. 2015-012940 and is related to U.S. Appl. No. 15/006,539; with English language translation.

*Primary Examiner* — Anthony Nguyen
(74) *Attorney, Agent, or Firm* — Studebaker & Brackett PC

(57) ABSTRACT

A rotation force transmission mechanism (30) includes a torque limiter (50), a breaking member (60) and a clutch member (55). The torque limiter (50) is configured to couple the first rotating member (35) and the driving source (40) to each other so as to able to transmit the rotation force until a torque of a predetermined value is applied, and to decouple from each other if a torque larger than the predetermined value is applied. The braking member (60) is configured to apply a torque exceeding the predetermined value to the first rotating member (35). The clutch member (55) is capable of being switched into a transmission state in which the rotation force can be transmitted to the first rotating member (35) and an interruption state in which the transmission of the rotation force is interrupted, in the second rotation force transmission path (P2).

6 Claims, 5 Drawing Sheets

(51) Int. Cl.
  *F16D 7/00*    (2006.01)
  *F16D 43/20*   (2006.01)
  *G03G 15/23*   (2006.01)

(52) U.S. Cl.
  CPC ........... *F16D 43/20* (2013.01); *G03G 15/234* (2013.01); *G03G 2221/1657* (2013.01)

(58) Field of Classification Search
  USPC ........................................................ 399/401
  See application file for complete search history.

(56) References Cited

U.S. PATENT DOCUMENTS

| | | |
|---|---|---|
| 8,746,676 B2 | 6/2014 | Ota |
| 2003/0156864 A1* | 8/2003 | Tachiki .................. G03G 15/01 399/297 |
| 2005/0238398 A1* | 10/2005 | Aono ................. G03G 15/6579 399/388 |
| 2011/0069995 A1* | 3/2011 | Sato ................... G03G 15/0896 399/258 |
| 2012/0051818 A1* | 3/2012 | Yamaguchi .............. B65H 3/06 399/397 |
| 2013/0140758 A1 | 6/2013 | Ota |
| 2013/0187330 A1* | 7/2013 | Kuroda ..................... B41J 3/60 271/225 |

* cited by examiner

ROTATION FORCE TRANSMISSION MECHANISM AND IMAGE FORMING APPARATUS

INCORPORATION BY REFERENCE

This application is based on and claims the benefit of priority from Japanese Patent application No. 2015-012940 filed on Jan. 27, 2015, the entire contents of which are incorporated herein by reference.

BACKGROUND

The present disclosure relates to a rotation force transmission mechanism which rotates a plurality of rotating members by a single driving source and an image forming apparatus including this rotation force transmission mechanism.

In an image forming apparatus, in order to cope with cost reduction, energy saving or space saving, an image forming unit and a sheet conveying unit are configured such that a plurality of rotating members are rotated by employing a single driving source. However, in a case where the single driving source is thus employed, since a rotation direction of each of the rotating members is limited, if the rotation direction of one of the rotating members is switched, the other rotating members need to be stopped, thus causing time loss.

Therefore, in a rotation force transmission mechanism configured to rotate two rotating members by employing a single driving source, a principal construction employs a clutch in order to switch the rotation direction of one rotating member without stopping the other rotating member. In the rotation force transmission mechanism of such a construction, one rotating member is provided with a torque limiter; while at the time in which the clutch is inoperative, a torque applied to the torque limiter is lower than a predetermined set value and then the one rotating member rotates in one direction, if the clutch is operative, a torque applied to the torque limiter is larger than the predetermined value and then the one rotating member is rotated in the other direction.

However, in such a construction, although it is possible to rotate one rotating member in one direction and in the other direction, it is impossible to temporarily stop the rotation of the one rotating member. In a case where the rotation of the one rotating member is stopped, since it is necessary to stop the driving source, the rotation of the other rotating member is also forced to be stopped.

Alternatively, a rotation force transmission mechanism configured to rotate one rotating member by a single driving source is sometimes constructed to have a clutch which stops the rotation of the rotating member in an operative state and permits the rotation of the rotating member in a non-operative state. In such a construction, in the non-operative state of the clutch, a driving force of a driving force is transmitted to the rotating force via a torque limiter and then the rotating member rotates, and in the operative state of the clutch, the rotation of the rotating member is stopped and the transmission of the rotation force from the driving force to the rotating member is interrupted by the torque limiter. In this manner, the rotation of the rotating member can be stopped without stopping the driving source.

However, in such a construction, although the rotation of the rotating member can be stopped without stopping the driving source, it is not possible to switch the rotation direction of the rotating member.

SUMMARY

In accordance with an embodiment of the present disclosure, a rotation force transmission mechanism is configured to transmit a rotation force from a single driving source to a first rotating member and a second rotating member. The rotation force transmission mechanism includes a first rotation force transmission path, a second rotation force transmission path, a third rotation force transmission path, a torque limiter, a breaking member and a clutch member. The first rotation force transmission path is configured to transmit the rotation force in a first direction from the driving source to the first rotating member. The second rotation force transmission path is configured to transmit the rotation force in a second direction opposite to the first direction from the driving source to the first rotating member. The third rotation force transmission path is configured to transmit the rotation force from the driving source to the second rotating member. The torque limiter is provided between the first rotating member and the driving source in the first rotation force transmission path. The torque limiter is configured to couple the first rotating member and the driving source to each other so as to be able to transmit the rotation force until a torque of a predetermined value is applied, and to decouple from each other if a torque larger than the predetermined value is applied. The braking member is configured to apply a torque exceeding the predetermined value to the first rotating member. The clutch member is capable of being switched into a transmission state in which the rotation force can be transmitted to the first rotating member and an interruption state in which the transmission of the rotation force is interrupted, in the second rotation force transmission path. The rotation force is transmitted to the first rotating member and the second rotating member such that the first rotating member and the second rotating member are rotated in any one of a first rotation state, a second rotation state and a third rotation state. In the first rotation state, while the clutch member is switched into the interruption state to interrupt the transmission of the rotation force to the first rotating member through the second rotation force transmission path, the rotation force is transmitted to the first rotating member through the first rotation force transmission path to rotate the first rotating member in the first direction and also the second rotating member is rotated through the third rotation force transmission path. In the second rotation state, while the clutch member is switched into the transmission state to transmit the rotation force to the first rotating member through the second rotation force transmission path, the first rotating member applies a torque exceeding the predetermined value to the torque limiter to interrupt the transmission of the rotation force to the first rotating member through the first rotation force transmission path and then to rotate the first rotating member in the second direction and also the second rotating member is rotated through the third rotation force transmission path. In the third rotation state, while the clutch member is switched into the interruption state to interrupt the transmission of the rotation force to the first rotating member through the second rotation force transmission path, the breaking member applies a torque exceeding the predetermined value to the first rotating member to stop the rotation of the first rotating member in the first rotation force transmission path and also the second rotating member is rotated through the third rotation force transmission path.

In accordance with an embodiment of the present disclosure, an image forming apparatus includes a switchback roller, an ejecting roller and the rotation force transmission mechanism. The switchback roller is configured to rotate in a temporary ejection direction in which a sheet is to be temporarily ejected and in an inversion direction opposite to the temporary ejection direction. The ejecting roller is configured to rotate in an ejection direction in which a sheet is to be ejected. The first rotating member and the second rotating member of the rotation force transmission mechanism are respectively the switchback roller and the ejecting roller. The rotation force transmission mechanism transmits the rotation force to the switchback roller and the ejecting roller such that the switchback roller and the ejecting roller rotate in any one of a first rotation state, a second rotation state and a third rotation state. In the first rotation state, the switchback roller rotates in the temporary ejection direction and the ejecting roller rotates in the ejection direction. In the second rotation state, the switchback roller rotates in the inversion direction and the ejecting roller rotates in the ejection direction. In the third rotation state, the rotation of the switchback roller is stopped and the ejecting roller rotates in the ejection direction.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to figures, a rotation force transmission mechanism and an image forming apparatus according to an embodiment of the present disclosure will be described.

Figure 1:
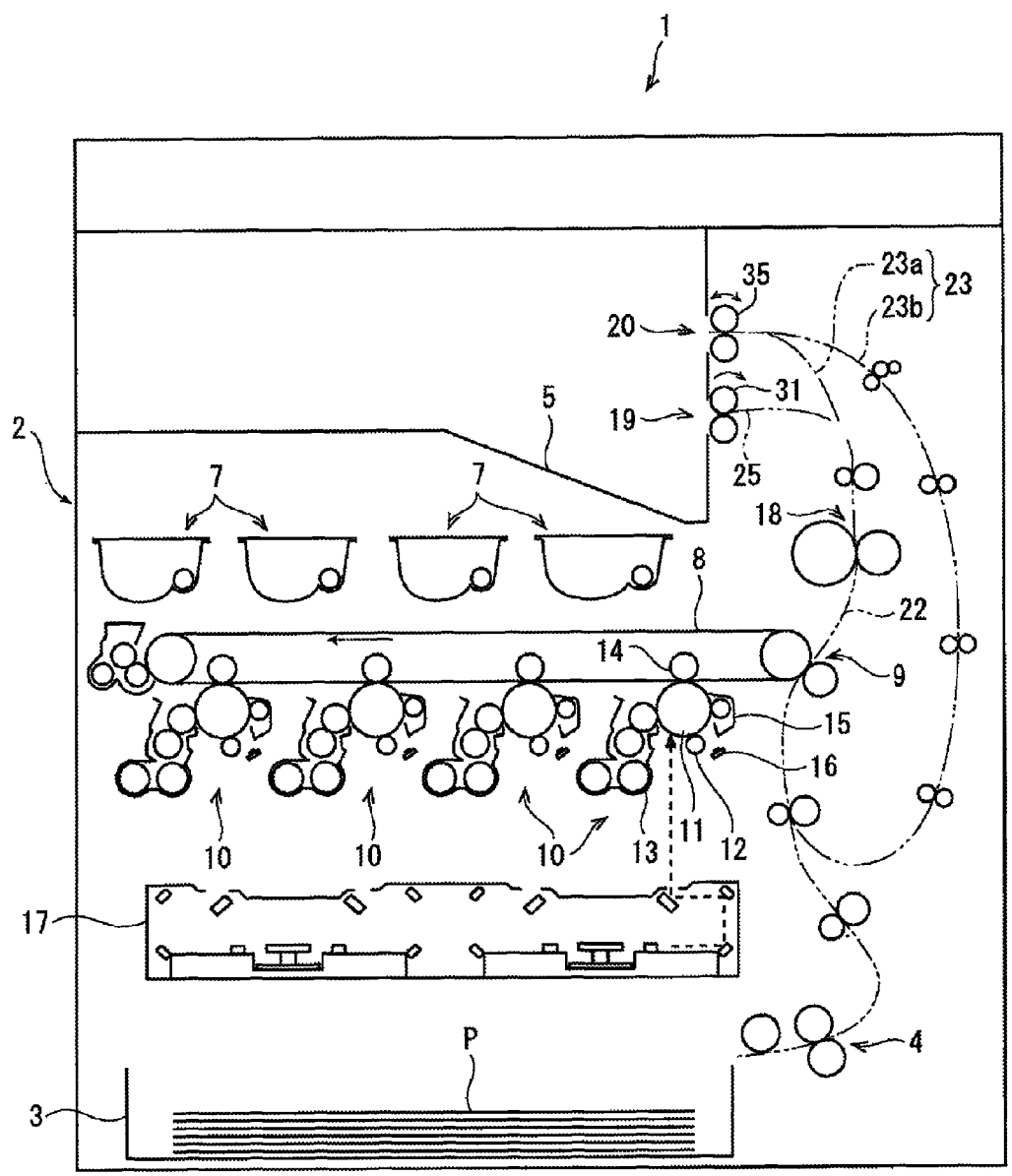
FIG. 1 is a schematic view showing an outline of a color printer according to an embodiment of the present disclosure.

First, with reference to FIG. 1, the entire structure of a color printer 1 (image forming apparatus) will be described. FIG. 1 is a schematic diagram schematically showing the color printer according to an embodiment of the present disclosure. In the following description, a front side of the sheet plane of FIG. 1 shows a front side of the color printer 1 and left and right directions are based on a direction viewed from the front side of the color printer 1.

The color printer 1 has a box-shaped printer main body 2. Under the printer main body 2, a sheet feeding part 4 configured to feed a sheet P from a sheet feeding cassette 3 is provided. On an upper face of the printer main body 2, an ejected sheet tray 5 is formed. Inside of the printer main body 2, toner containers 7 respectively storing different color toner (for example, four colors of magenta, cyan, yellow and black) are provided. Under the toner containers 7, an intermediate transferring belt 8 is bridged between a plurality of rollers. At one end (right end in the figure) of the intermediate transferring belt 8, a second transferring part 9 is formed. Under the transferring belt 7, four image forming parts 10 corresponding to respective colors of the toner are provided. The image forming part 10 has a photosensitive drum 11, as an image carrier, rotatably provided. Around the photosensitive drum 10, a charger 12, a development device 13, a transferring roller 14, a cleaning device 15 and a static eliminator 16 are arranged along a rotation direction of the photosensitive drum 10. Under the image forming parts 10, an exposure device 17 containing a laser scanning unit (LSU) is provided. On an upper right of the image forming parts 10, a fixing device 18 is provided. Above the fixing device 18, a sheet ejecting part 19 facing the ejected sheet tray 5 is provided. Above the sheet ejecting part 19, a switchback part 20 facing the ejected sheet tray 4 is provided.

Inside of the printer main body 2, a main sheet conveying path 22 is formed extending from the sheet feeding part 4 toward the sheet ejecting part 19 through the second transferring part 9 and the fixing device 18. The main sheet feeding path 22 is branched into a duplex printing path 23 from between the fixing device 18 and the sheet ejecting part 19. The duplex printing path 23 has a switchback path 23a and an inversion path 23b. The switchback path 23a extends from a downstream side of the fixing device 18 on the main sheet conveying path 23 toward the switchback part 20. The inversion path 23b extends from the switchback part 20 and is joined to the main sheet conveying path 22 at a downstream side form the sheet feeding part 4.

Next, the operation of forming an image by the color printer 1 having such a configuration will be described. When image data is inputted from a computer or the like connected to the printer 1, an image forming is carried out as follows.

In each image forming part 10, after a surface of the photosensitive drum 11 is charged by the charger 12, the exposure device 17 exposes the surface of the photosensitive drum 11 with a laser light (refer to an arrow p in FIG. 1) to form an electrostatic latent image on the surface of the photosensitive drum 11. The electrostatic latent image is then developed into a toner image of corresponding color by the developing device 13. The toner image is first-transferred on the intermediate transferring belt 8 by the transferring roller 14. The above-mentioned operation is repeated in order by the image forming parts 10, thereby forming a full color toner image onto the intermediate transferring belt 8. Incidentally, toner and residual electric charge remained on the photosensitive drum 11 is removed by the cleaning device 15 and the static eliminator 16, respectively.

On the other hand, the sheet fed from the sheet feeding cassette 3 or a multi bypass tray (not shown) by the sheet feeding part 4 is conveyed to the second transferring part 9 in a suitable timing for the above-mentioned image forming operation. Then, in the second transferring part 9, the full color toner image on the intermediate transferring belt 8 is second-transferred onto the sheet. The sheet with the second-transferred toner image is conveyed to a downstream side along the main sheet conveying path 22 to enter the fixing device 18 and then, the toner image is fixed on the sheet in the fixing device 18. The sheet with the fixed toner image is ejected from the sheet ejecting device 19 onto the ejected sheet tray 5.

In a case of duplex printing, the sheet in which the toner image is fixed by the fixing device 18 on one face is conveyed to the switchback part 20 through the switchback path 23a of the duplex conveying path 23. When the sheet is conveyed to the switchback part 20 at a normal sheet interval and a sensor detects that a rear end of the sheet reaches a predetermined position, the conveying direction of the sheet is inversed at predetermined timing in the switchback part 20 and the sheet is conveyed to the inversion path 23b. The sheet is conveyed along the inversion path 23b and then the main sheet conveying path 22 at a downstream side of the sheet feeding part 4. On the other hand, in each image forming part 10, toner image corresponding to image to be formed on the other face of the sheet is formed on the surface of the intermediate transferring belt 8. Then, the toner image formed on the intermediate transferring belt 8 is transferred on the other face of the sheet. Then, the toner image is fixed on the sheet by the fixing device 18. The sheet in which the toner images are fixed on the both faces is conveyed along the main sheet conveying path 22 and then ejected on the ejected sheet tray 5 through the sheet ejecting part 19.

Figure 2:
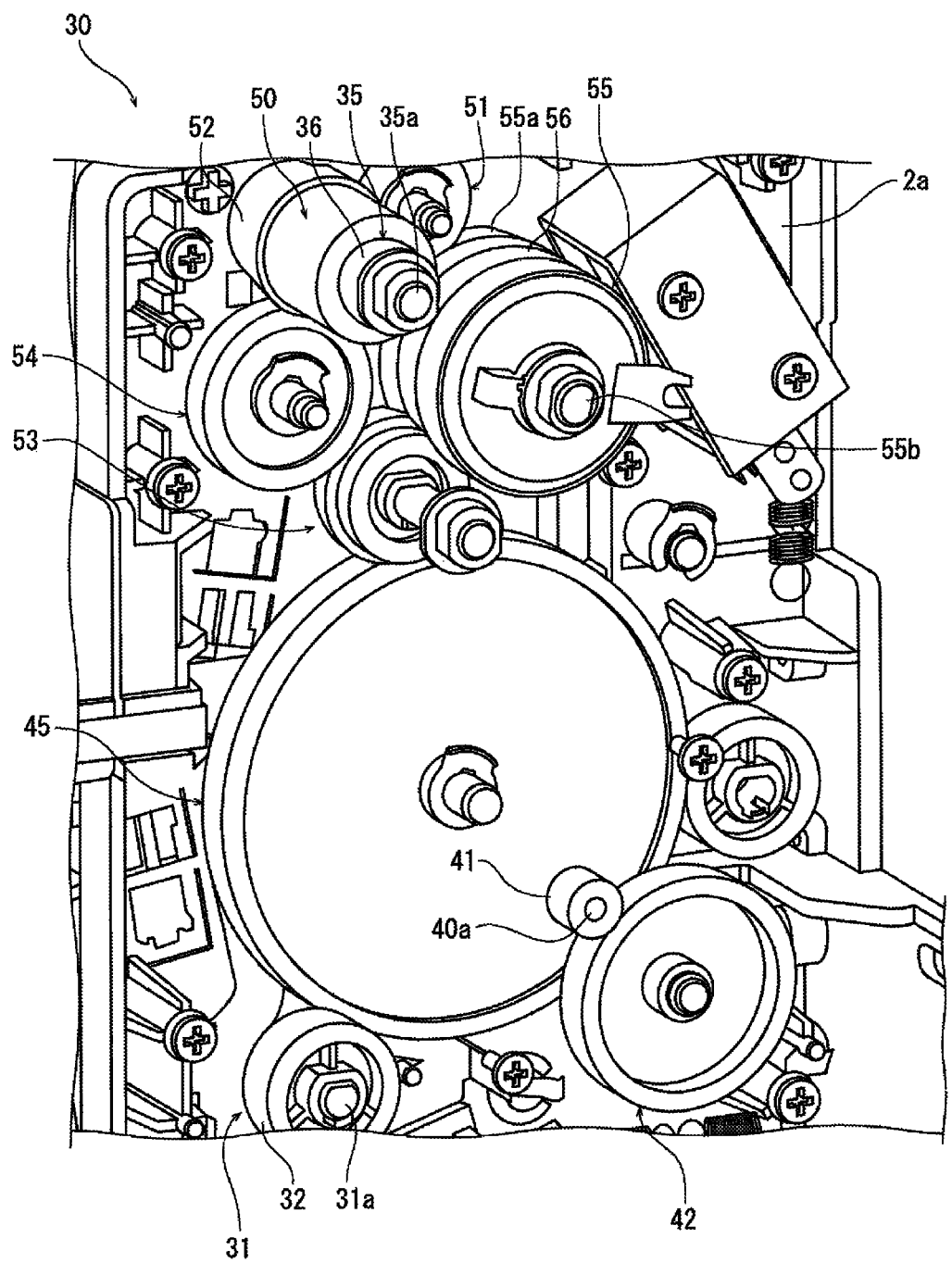
FIG. 2 is a perspective view showing a rotation force transmission mechanism, viewed from the front side, according to an embodiment of the present disclosure.
Figure 3A:
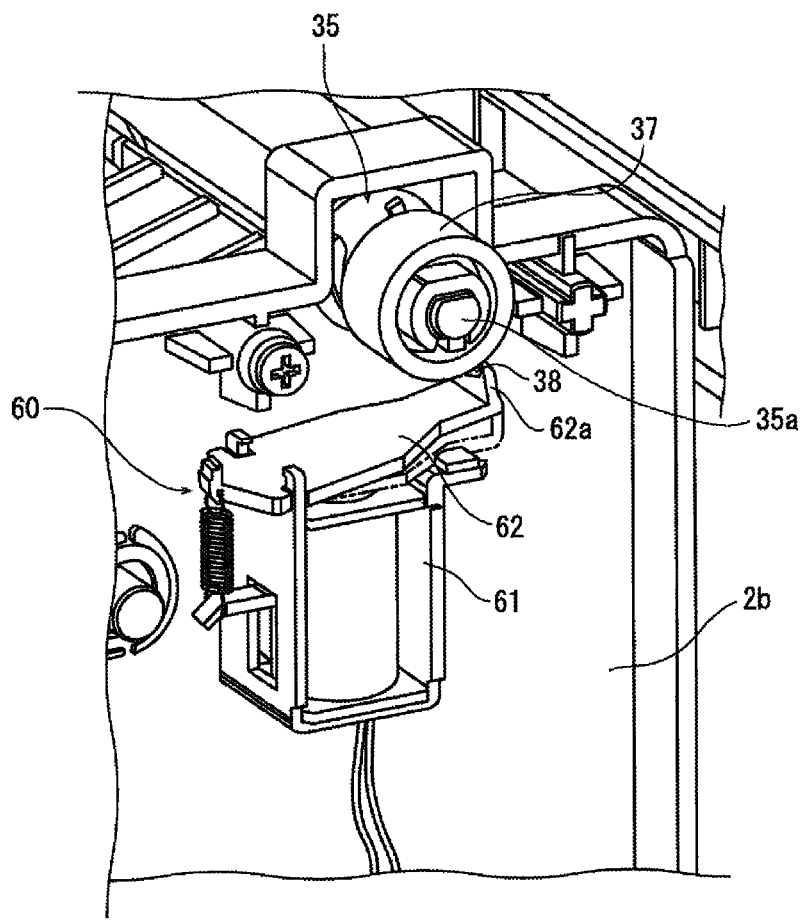
FIG. 3A is a perspective view showing a rear end of a switchback roller, in the rotation force transmission mechanism according to the embodiment of the present disclosure.
Figure 3B:
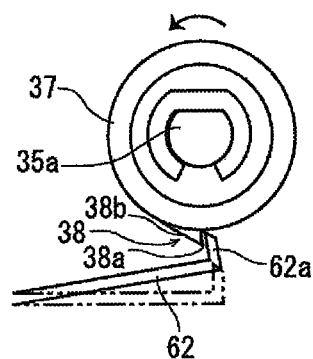
FIG. 3B is a front view showing an actuating member and a solenoid, viewed from the rear side, in the rotation force transmission mechanism according to the embodiment of the present disclosure.
Figure 4:
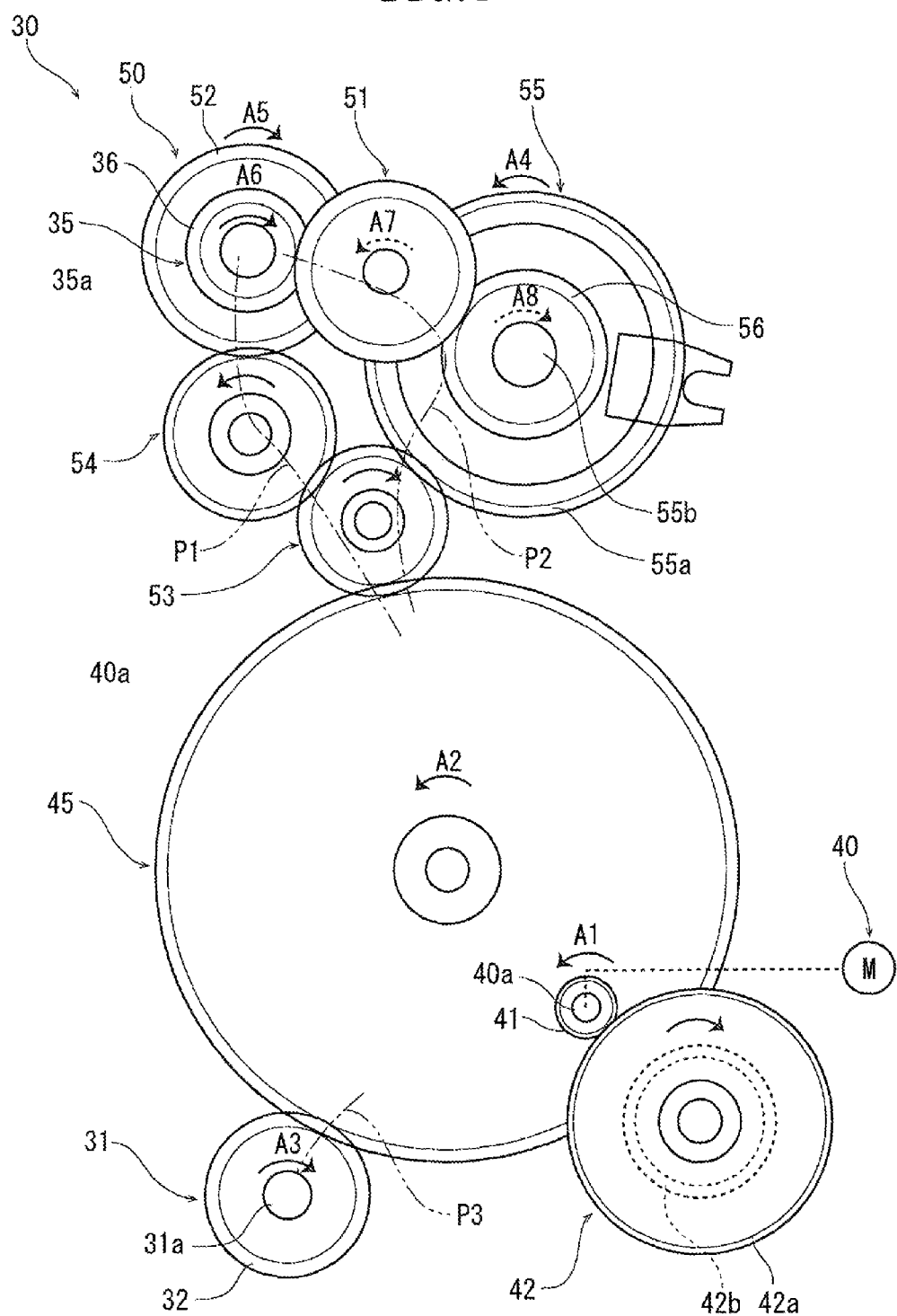
FIG. 4 is a front view showing an operation of the switchback roller rotating in a temporary ejection direction, in the rotation force transmission mechanism according to the embodiment of the present disclosure.
Figure 5:
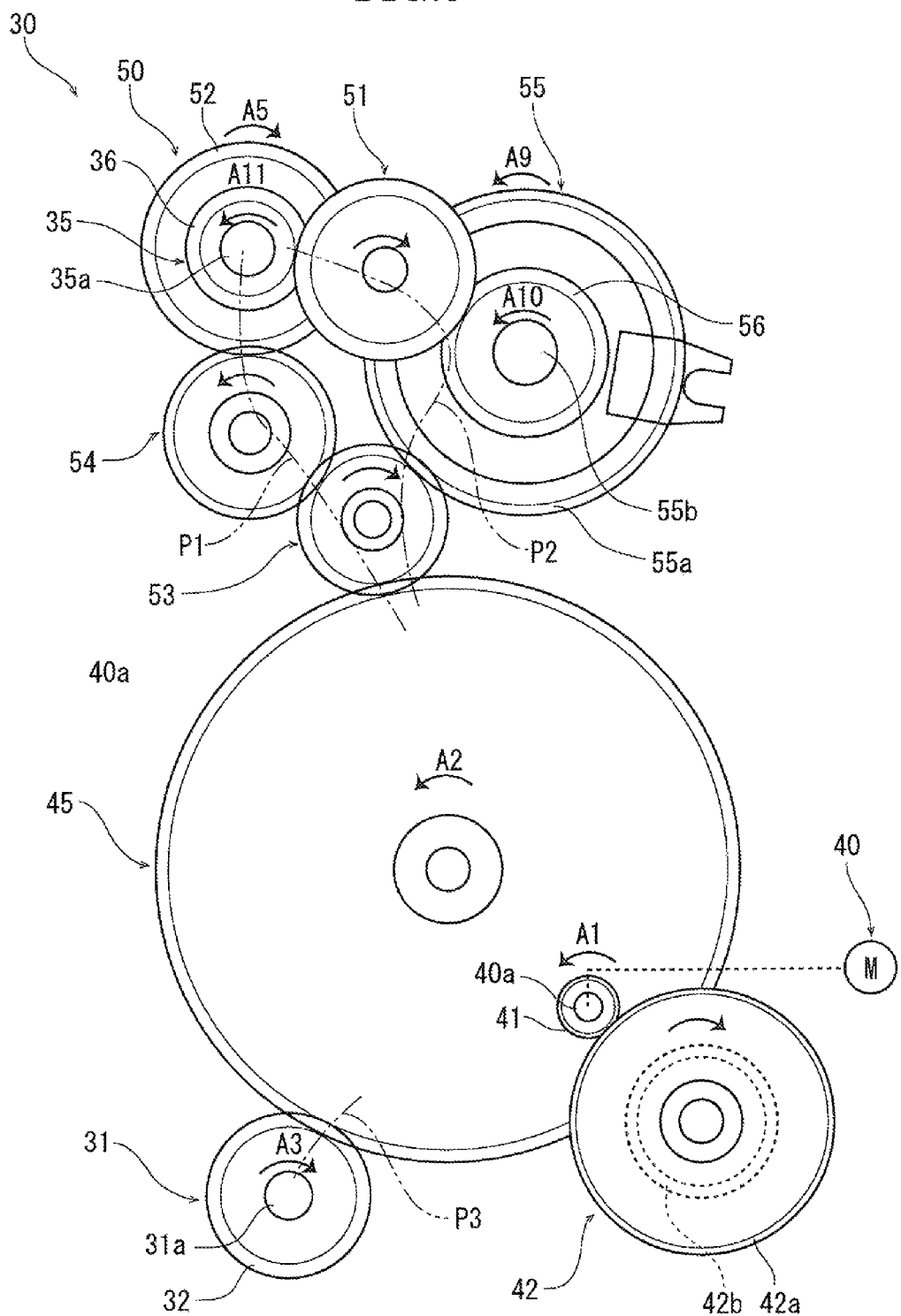
FIG. 5 is a front view showing an operation of the switchback roller rotating in an inversion direction, in the rotation force transmission mechanism according to the embodiment of the present disclosure.

Next, a rotation force transmission mechanism 30 configured to transmit a driving force to the sheet ejecting part 19 and the switchback part 20 will be described with reference to FIG. 1 and FIG. 2 to FIG. 5. FIG. 2 is a perspective view showing the rotation force transmission mechanism viewed from the front side; FIG. 3A is a perspective view showing the vicinity of a rear end of a rotating shaft of a switchback roller viewed from the rear side; FIG. 3B is a front view showing an actuating member and a solenoid, viewed from the rear side; and FIG. 4 and FIG. 5 are front views schematically showing the rotation force transmission mechanism, wherein FIG. 4 is a front view illustrating a rotation direction of each gear when the switchback roller rotates in a temporary ejection direction, and FIG. 5 is a view illustrating the rotation direction of each gear when the switchback roller rotates in the inversion direction.

The rotation force transmission mechanism 30 rotates an ejecting roller 31 (a second rotating member) provided in the sheet ejecting part 19 and a switchback roller 35 (a first rotating member) provided in the switchback part 20. Specifically, when a sheet on which an image has been formed is ejected to the ejected sheet tray 5, the rotation force transmission mechanism 30 rotates the ejecting roller 31 in one direction (in a clockwise direction of FIG. 1). Also, at the duplex printing, until the rear end of the sheet in which an image has been formed on one face reaches the predetermined position, the rotation force transmission mechanism 30 rotates the switchback roller 35 in one direction (a first direction, a clockwise direction of FIG. 1) and subsequently rotates the switchback roller 35 in the other direction (a second direction, a counterclockwise direction of FIG. 1) so as to convey the sheet to the inversion path 23b. In addition, the rotation force transmission mechanism 30 stops the rotation of the switchback roller 35.

As shown in FIG. 2, the ejecting roller 31 has a rotating shaft 31a and a roller main body (not shown). The rotating shaft 31a is rotatably supported by front and rear side plates 2a, 2b of the printer main body 2. At a front end of the rotating shaft 31a, a roller gear 32 is fixedly attached.

The switchback roller 35 has a rotating shaft 35a and a roller main body (not shown). The rotating shaft 35a is rotatably supported by the front and rear side plates 2a, 2b of the printer main body 2. At a front end of the rotating shaft 35a, a roller gear 36 is fixedly attached. At a rear end of the rotating shaft 35a, as shown in FIG. 3A, a cylindrical actuating member 37 is fixedly attached. On an outer circumferential face of the actuating member 37, a projection 38 is formed. As shown in FIG. 3B, the projection 38 has a perpendicular face 38a extending in a radial direction from a center of the actuating member 37 and an inclined face 38b inclined in the clockwise direction, viewed from the rear side, from an outer edge of the perpendicular face 38a toward the outer circumferential face.

The rotation force transmission mechanism 30, as shown in FIG. 2 to FIG. 5, includes a single one-way motor 40 (a driving source, not shown in FIG. 2) rotating in one direction, an output gear 45 rotated by rotation of the motor 40, a torque limiter 50 and an electromagnetic clutch 55 (a clutch member) which are provided between the switchback roller 35 and the output gear 45 and a solenoid 60 (a braking member, refer to FIG. 3A.) which is provided in the vicinity of the rear end of the switchback roller 35.

The motor 40, disposed on a front side of a sheet plane of FIG. 2 and FIG. 4, has an output shaft 40a which is driven to rotate in the counterclockwise direction of FIG. 4. At an end of the output shaft 40a, a motor gear 41 is fixedly attached. The motor gear 41 meshes with a large diameter gear 42a of a two-step gear 42 having the large diameter gear 42a and a small diameter gear 42b which are coaxially formed.

The output gear 45 meshes with the small diameter gear 42b of the two-step gear 42. In this manner, the rotation of the motor 40 rotates the output gear 45 in a same direction as the rotation direction of the motor 40 (the counterclockwise direction of FIG. 2 and FIG. 4) via the motor gear 41 and the two-step gear 42.

The roller gear 32 fixedly attached to the front end of the rotating shaft 31a of the ejecting roller 31 meshes with the output gear 45. In this manner, the ejecting roller 31 rotates in an opposite direction to the rotation direction of the output gear 45, that is, in the clockwise direction of FIG. 2 and FIG. 4, and then ejects the sheet. Thus, a rotation force in the clockwise direction is transmitted to the ejecting roller 31 via a gear train (a third rotation force transmission path) having the motor gear 41, the two-step gear 42 and the output gear 45.

The torque limiter 50 is a component having an inner wheel and an outer wheel, which transmits a torque between the inner wheel and the outer wheel if a torque acting between the inner wheel and the outer wheel is within a range of a predetermined set value; interrupts the torque transmission between the inner wheel and the outer wheel if the torque exceeds the predetermined set value. The inner wheel of the torque limiter 50 is fixedly attached to the roller gear 36 fixedly attached to the front end of the rotating shaft 35a of the switchback roller 35. With the roller gear 36, an idle gear 51 is meshed. To the outer wheel of the torque limiter 50, a driving gear 52 is fixedly attached. The driving gear 52 meshes with the output gear 45 via a first intermediate gear 53 and a second intermediate gear 54.

The torque limiter 50 transmits the rotation force in one direction (the clockwise direction of FIG. 2 and FIG. 4) to the roller gear 36 through the outer wheel, that is, the driving gear 52, until a torque of the predetermined set value is applied to the inner wheel, that is, the roller gear 36; interrupts the transmission of the rotation force in one direction to the roller gear 36 through the driving gear 52 if the torque applied to the roller gear 36 exceeds the predetermined set value. Namely, the roller gear 36, that is, the switchback roller 35 idles with respect to the driving gear 52.

The electromagnetic clutch 55 is a component having an input gear 55a and an output shaft 55b, which is capable of being switched between a transmission state in which the rotation force input to the input gear 55a is transmitted to the output shaft 55b and an interruption state in which the transmission of the rotation force to the output shaft 55b is interrupted. The input gear 55a meshes with the output gear 45 through the first intermediate gear 53. To the output shaft 55b, a clutch output gear 56 is fixedly attached, and an idle gear 51 meshes with the clutch output gear 56.

In this manner, if the electromagnetic clutch 55 is switched into the transmission state, the rotation of the output gear 45 is transmitted to the output shaft 55b through the first intermediate gear 53 and then the rotation of the output shaft 55b is transmitted from the clutch output gear 56 to the idle gear 51. If the electromagnetic clutch 55 is switched into the interruption state, the clutch output gear 56 rotates through the first intermediate gear 52; and however, its rotation is not transmitted to the output shaft 55b. Namely, the output shaft 55b does not rotate.

The solenoid 60, as shown in FIG. 3A, is a flapper type solenoid having a main body 61 and a movable piece 62 which is moved upward and downward with respect to the main body 61 by energization. At a tip end of the movable piece 62, a claw 62a is formed. The solenoid 60 is disposed under the actuating member 37 fixedly attached to the rear end of the rotating shaft 35a of the switchback roller 35.

By energization, the solenoid 60 is switched into a separate posture (indicated by the double-dotted chain line of FIG. 3B) in which the movable piece 62 is moved downward from the outer circumferential face of the actuating member 37 and an engagement posture in which the movable piece 62 is moved upward by action of a spring to engage the claw 62a with the projection 38 of the actuating member 37. If the solenoid 60 is switched into the engagement posture, as shown in FIG. 3B, when the rotating shaft 35a of the switchback roller 35 is rotated in the counterclockwise direction, viewed from the rear side (the clockwise direction viewed from the front side), the claw 62a is engagingly locked with the perpendicular face 38a of the projection 38 and thus the rotation of the switchback roller 35 is stopped.

If the solenoid 60 stops the rotation of the rotating shaft 35a of the switchback roller 35, in the torque limiter 50, the torque applied to the inner wheel fixedly attached to the rotating shaft 35a exceeds the predetermined set value, and then the roller gear 36 fixedly attached to the outer wheel idles with respect to the rotating shaft 35a.

Thus, to the switchback roller 35, while the rotation force in the clockwise direction is transmitted through a gear train (a first rotation force transmission path) having the motor gear 41, the two-step gear 42, the output gear 45, the first intermediate gear 53, the second intermediate gear 54, the driving gear 52 and the roller gear 36, the rotation force in the counterclockwise direction is transmitted via another gear train (a second rotation force transmission path) having the motor gear 41, the two-step gear 42, the output gear 45, the first intermediate gear 53, the input gear 55a of the electromagnetic clutch 55, the clutch output gear 56 and the idle gear 51.

An action of the rotation force transmission mechanism 30 having the above configuration at duplex printing will be described with reference to FIG. 4 and FIG. 5. In a case where duplex printing is carried out, as described previously, the sheet in which the toner image is fixed on one face by the fixing device 18 is firstly conveyed along the switchback path 23a through the switchback part 20 until the rear end of the sheet reaches the predetermined position. Namely, the switchback roller 35 temporarily rotates in the clockwise direction of FIG. 4 (hereinafter, referred to as a temporary ejection direction) to eject the sheet through the switchback part 20.

With reference to FIG. 4, an operation of the rotation force transmission mechanism 30 when the switchback roller 35 rotates in the temporary ejection direction. In order to rotate the switchback roller 35 in the temporary ejection direction, the electromagnetic clutch 55 is switched into the interruption state and the solenoid 60 is switched into the separate posture. The motor 40 is driven so that the output shaft 40a rotates in the counterclockwise direction (refer to the arrow A1). When the motor 40 is driven, the output gear 45 rotates in the counterclockwise direction through the motor gear 41 and the two-step gear 42 (refer to the arrow A2). Then, to the ejecting roller 31, the rotation force in the clockwise direction (refer to the arrow A3) is transmitted through the third rotation force transmission path P3, making it possible to eject the sheet.

Also, in the electromagnetic clutch 55, by the rotation of the output gear 45, the input gear 55a is rotated through the first intermediate gear 53 (refer to the arrow A4); however, its rotation is not transmitted to the output shaft 55b. Therefore, the rotation force is not transmitted to the clutch output gear 56 fixedly attached to the output shaft 55b and the idle gear 51 that meshes with the clutch output gear 56.

In the torque limiter 50, the driving gear 52 fixedly attached to the outer wheel rotates in the clockwise direction of FIG. 4 (refer to the arrow A5) through the first intermediate gear 53 and the second intermediate gear 54. In addition, although the roller gear 36 fixedly attached to the inner wheel meshes with the idle gear 51, since the rotation force is not transmitted to the idle gear 51 from the electromagnetic clutch 55 as described previously, a torque is not applied to the inner wheel. Accordingly, the torque applied to the outer wheel is transmitted to the inner wheel and then the roller gear 36 rotates in the clockwise direction of FIG. 4 together with the driving gear 52 (refer to the arrow A6).

Then, since the roller gear 36 is fixedly attached to the rotating shaft 35a of the switchback roller 35, the rotation force in the clockwise direction of FIG. 4 (a first direction) is transmitted to the rotating shaft 35a through the first rotation force transmission path P1. This makes it possible to eject the sheet from the switchback unit 20. Incidentally, by the rotation of the roller gear 36, the idle gear 51 meshing with the roller gear 36 and the clutch output gear 56 meshing with the idle gear 51 are driven to be rotated (refer to the arrows A7, A8).

After the sheet is temporarily ejected until the rear end of the sheet reaches the predetermined position, the conveying direction of the sheet is inverted so that the sheet is conveyed along the inverting path 23b. Namely, the rotation direction of the switchback roller 35 is inverted into an inversion direction from the ejection direction.

With reference to FIG. 5, an operation of the rotation force transmission mechanism 30 when the switchback roller 35 rotates in the inversion direction will be described. In order to rotate the switchback roller 35 in the inversion direction, the electromagnetic clutch 55 is switched into the transmission state to permit the transmission of the rotation force from the input gear 55a to the output shaft 55b. Namely, through the first intermediate gear 53, the input gear 55a rotates in the counterclockwise direction of FIG. 5 (refer to the arrow A9), the rotation of the input gear 55a is transmitted to the output shaft 55b to rotate the output shaft 55b in the counterclockwise direction of FIG. 5, and together with the output shaft 55b, the clutch output gear 56 rotates in the counterclockwise direction of FIG. 5 (refer to the arrow A10). The rotation of the clutch output gear 56 is transmitted to the roller gear 36 through the idle gear 51. That is, to the roller gear 36, the rotation force in the counterclockwise direction of FIG. 5 (refer to the arrow A11) is transmitted. A torque of this rotation force is larger than the predetermined set value of the torque limiter 50.

On the other hand, in the torque limiter 50, through the first intermediate gear 53 and the second intermediate gear 54, the rotation force of the output gear 45 is transmitted to the driving gear 52. Since the torque applied to the roller gear 36 is larger than the predetermined set value of the torque limiter 50, the torque transmission between the inner wheel and the outer wheel in the torque limiter 50 is interrupted. That is, the rotation force of the driving gear 52 is not transmitted to the roller gear 36. Thus, to the roller gear 36, that is, to the switchback roller 35, the rotation force in the counterclockwise direction of FIG. 5 (refer to the arrow A11) is transmitted through the second rotation force transmission path P2 to convey the sheet along the inverting path 23b.

As described above, by switching the electromagnetic clutch 55 between the transmission state and the interruption state, the rotation direction of the switchback roller 35 can be inverted.

Incidentally, when the duplex printing is carried out, in order to increase a number of processed sheets per unit time, a plurality of sheets are processed simultaneously. For example, when a first sheet in which an image has been formed on one side is inverted by the switchback part 20 and then advances to the inverting path 23b, an image is formed on a second sheet. Then, when the second sheet in which the image has been formed on one side is inverted by the switchback part 20 and then advances to the inverting path 23b along which the first sheet is precedently conveyed, an image is formed on a third sheet. The plurality of sheets are thus conveyed along the main conveying path 22 and the duplex printing path 23.

However, in a case where a delay of conveying occurs owing to slipping of any sheet during the conveying and then the sheet cannot be conveyed to the secondary transferring part 9 at a suitable timing, it is necessary to temporarily delete an image formed on the intermediate transferring belt 8 or the photosensitive drum 11. Alternatively, depending on a time lag or the like in the data processing, it is necessary to wait the conveyed sheet temporality. In such a case, if the sheet stops during passing through the fixing device 18, since the sheet may be overheated at a high temperature and then an undesirable safety state may occur, the sheet needs to be stopped after passing through the fixing device 18 completely. Thus, after the rear end of the sheet passes through the fixing device 18 and the sheet is ejected by a predetermined length from the switchback part 20, it is necessary to wait the sheet until the timing at which the conveying direction is switched into the inversion direction. Namely, the rotation of the switchback roller 35 in the ejection direction needs to be temporarily stopped.

In such a case, the solenoid 60 is switched into the engagement posture. Then, as shown in FIG. 3B, the claw 62a of the movable piece 62 abuts against the perpendicular face 38a of the projection 38 of the actuating member 37 fixedly attached to the rotating shaft 35a of the switchback roller 35, and a torque is applied against a direction in which the rotation of the actuating member 37 is stopped. In this manner, in the torque limiter 50, since the rotating shaft 35a of the switchback roller 35 applies a torque larger than the predetermined set value to the roller gear 36, the torque transmission between the inner wheel and the outer wheel is interrupted and the torque applied to the rotating shaft 35a is not transmitted to the driving gear 52. That is, while the rotation of the switchback roller 35 is stopped, the driving gear 52 idles with respect to the rotating shaft 35a and then continues its rotation in the clockwise direction of FIG. 4.

If the image forming work is restarted, the solenoid 60 is switched into the separate posture and then the applying the torque to the rotating shaft 35a of the switchback roller 35 is released. Further, the electromagnetic clutch 55 is switched into the transmission state and then the switchback roller 35 rotates in the inversion direction to convey the sheet along the inverting path 23b. Incidentally, after the rear end of the sheet has passed through the fixing device 18, if the ejection of the sheet is stopped earlier than the timing at which the conveying direction is switched into the inversion direction, when the image forming work is restarted, the torque applied to the inner wheel of the torque limiter 50 is released and the rotation force of the driving gear 52 is transmitted to the roller gear 36. Namely, the switchback roller 35 rotates in the clockwise direction of FIG. 4 together with the driving gear 52, and the ejection of the sheet at the switchback part 20 is restarted.

Accordingly, during the sheet ejecting operation and the sheet inverting operation by the switchback roller 35 in the switchback part 20 and further during the stopping of the rotation of the switchback roller 35, since the motor 40 is not stopped and continues its rotation in the counterclockwise direction of FIG. 4 and FIG. 5, there is no problem with the sheet ejecting operation from the sheet ejecting part 19 by the ejecting roller 31.

As described above, in the rotation force transmission mechanism 30 of the present disclosure, the switchback roller 35 can be rotated in the ejection direction and the inversion direction smoothly and furthermore the rotation of the switchback roller 35 can be stopped without any problem on the rotation of the ejecting roller 31 in a state in which the rotation of the motor 40 in one direction is maintained. Namely, the rotation force transmission mechanism 30 can switch the the ejecting roller 31 and the switchback roller 35 into a first rotation state, a second rotation state and a third rotation state. In the first rotation state, the ejecting roller 31 rotates in the ejection direction and the switchback roller 35 rotates in the temporary ejection direction. In the second rotation state, the ejecting roller 31 rotates in the ejection direction and the switchback roller 35 rotates in the inversion direction. In the third rotation state, the ejecting roller 31 rotates in the ejection direction and the rotation of the switchback roller 35 is stopped.

Therefore, a time loss does not occur, and therefore a rotation force transmission performance can be improved. Also, since the ejecting roller 31 and the switchback roller 35 are driven by the single motor 40 rotatable in one direction, cost reduction and space saving become possible.

In the embodiment, by using an inexpensive and simple flapper type solenoid as a braking member, a torque exceeding the predetermined set value of the torque limiter 50 can be applied to the switchback roller 35. Incidentally, in place of the flapper type solenoid, another type of solenoid such as a bushing type solenoid, a braking member employing a frictional pad, a clutch or the like may be used.

Although the embodiment describes a case in which the rotation force transmission mechanism 30 rotates the ejecting roller 31 and the switchback roller 35 by the single motor 40, another roller can also be rotated. For example, another roller can be rotated while being mashed with the output gear 45, or alternatively, as in the embodiment, another roller can be rotated via the torque limiter 50 or the electromagnetic clutch 55.

The embodiment was described in a case of applying the configuration of the present disclosure to the color printer 1. On the other hand, in another embodiment, the configuration of the disclosure may be applied to another image forming apparatus, such as a copying machine, a facsimile or a multifunction peripheral, except for the printer 1.

While the preferable embodiment and its modified example of the image forming apparatus of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment of the disclosure as mentioned above.

What is claimed is:

1. A rotation force transmission mechanism configured to transmit a rotation force from a single driving source to a first rotating member and a second rotating member, the rotation force transmission mechanism comprising:
    a first rotation force transmission path configured to transmit the rotation force in a first direction from the driving source to the first rotating member;
    a second rotation force transmission path configured to transmit the rotation force in a second direction opposite to the first direction from the driving source to the first rotating member;
    a third rotation force transmission path configured to transmit the rotation force from the driving source to the second rotating member;
    a torque limiter provided between the first rotating member and the driving source in the first rotation force transmission path, and configured to couple the first rotating member and the driving source to each other so as to be able to transmit the rotation force until a torque of a predetermined value is applied, and to decouple from each other if a torque larger than the predetermined value is applied;
    a braking member configured to apply a torque exceeding the predetermined value to the first rotating member; and
    a clutch member capable of being switched into a transmission state in which the rotation force can be transmitted to the first rotating member and an interruption state in which the transmission of the rotation force is interrupted, in the second rotation force transmission path,
    wherein the rotation force is transmitted to the first rotating member and the second rotating member such that the first rotating member and the second rotating member are rotated in any one of a first rotation state, a second rotation state and a third rotation state:
    the first rotation state in which while the clutch member is switched into the interruption state to interrupt the transmission of the rotation force to the first rotating member through the second rotation force transmission path, the rotation force is transmitted to the first rotating member through the first rotation force transmission path to rotate the first rotating member in the first direction and also the second rotating member is rotated through the third rotation force transmission path;
    the second rotation state in which while the clutch member is switched into the transmission state to transmit the rotation force to the first rotating member through the second rotation force transmission path, the first rotating member applies a torque exceeding the predetermined value to the torque limiter to interrupt the transmission of the rotation force to the first rotating member through the first rotation force transmission path and then to rotate the first rotating member in the second direction and also the second rotating member is rotated through the third rotation force transmission path; and
    the third rotation state in which while the clutch member is switched into the interruption state to interrupt the transmission of the rotation force to the first rotating member through the second rotation force transmission path, the breaking member applies a torque exceeding the predetermined value to the first rotating member to stop the rotation of the first rotating member in the first rotation force transmission path and also the second rotating member is rotated through the third rotation force transmission path.

2. The rotation force transmission mechanism according to claim 1, wherein the braking member is a flapper type solenoid having a main body and a movable piece which is movable in directions close to or separate away from the main body by energization.

3. The rotation force transmission mechanism according to claim 2,
    wherein the first rotating member has a projection protruding in a radial direction,
    the flatter type solenoid is provided with a claw capable of engaging with the projection at a tip end of the movable piece, the flapper type solenoid capable of being switched into an engagement posture at which the claw engages with the projection and a separate posture at which the claw is spaced away from the protrusion, and
    by being switched into the engagement posture, a torque exceeding the predetermined value is applied to the first rotating member.

4. The rotation force transmission mechanism according to claim 1, wherein the driving source is a one-way rotating motor.

5. An image forming apparatus comprising:
    a switchback roller configured to rotate in a temporary ejection direction in which a sheet is to be temporarily ejected and in an inversion direction opposite to the temporary ejection direction;
    an ejecting roller configured to rotate in an ejection direction in which a sheet is to be ejected; and
    the rotation force transmission mechanism according to claim 1,
    wherein the first rotating member and the second rotating member of the rotation force transmission mechanism are respectively the switchback roller and the ejecting roller and the rotation force transmission mechanism transmits the rotation force to the switchback roller and the ejecting roller such that the switchback roller and the ejecting roller rotate in any one of a first rotation state, a second rotation state and a third rotation state:

the first rotation state in which the switchback roller rotates in the temporary ejection direction and the ejecting roller rotates in the ejection direction;

the second rotation state in which the switchback roller rotates in the inversion direction and the ejecting roller rotates in the ejection direction; and the third rotation state in which the rotation of the switchback roller is stopped and the ejecting roller rotates in the ejection direction.

6. The image forming apparatus according to claim 5, wherein, when the rotation direction of the switchback roller is switched from the temporary ejection direction to the inversion direction, the ejecting roller and the switchback roller are switchable into the third rotation state.

* * * * *